United States Patent
LeFlécher et al.

(10) Patent No.: US 6,322,830 B1
(45) Date of Patent: Nov. 27, 2001

(54) READY-TO-BAKE, SHELF-STABLE CAKE DOUGH AND PROCESS FOR ITS MANUFACTURE

(75) Inventors: René LeFlécher, Versailles (FR); Peter Robson, North Yorkshire (GB)

(73) Assignee: Bestfoods, Englewood Cliffs, NJ (US)

(*) Notice: Subject to any disclaimer, the term of this patent is extended or adjusted under 35 U.S.C. 154(b) by 0 days.

(21) Appl. No.: 09/397,970

(22) Filed: Sep. 16, 1999

Related U.S. Application Data

(62) Division of application No. 09/044,449, filed on Mar. 19, 1998, now Pat. No. 6,039,994.

(30) Foreign Application Priority Data

Apr. 4, 1997 (EP) .................................................. 97105619

(51) Int. Cl.$^7$ .................................................. A21D 10/02
(52) U.S. Cl. ........................ 426/128; 426/94; 426/106; 426/312; 426/316; 426/319; 426/404; 426/486; 426/496; 426/498
(58) Field of Search .............................. 426/94, 312, 316, 426/320, 319, 404, 410, 496, 486, 498, 418, 504, 419, 106, 128

(56) References Cited

U.S. PATENT DOCUMENTS

| | | | |
|---|---|---|---|
| 4,904,493 | 2/1990 | Petrizzelli | 426/549 |
| 5,366,744 | 11/1994 | Drummond et al. | 426/128 |
| 5,549,922 | 8/1996 | Juchem | 426/618 |

FOREIGN PATENT DOCUMENTS

| | | |
|---|---|---|
| 145 550 | 11/1983 | (EP) . |
| 156 573 | 10/1985 | (EP) . |
| 488 012 A2 | 11/1991 | (EP) . |
| 510 320 A1 | 2/1992 | (EP) . |
| 666 028 A1 | 8/1995 | (EP) . |
| 97 10 5619 | 8/1997 | (EP) . |
| 2 672 469 | 2/1991 | (FR) . |
| 2 195 225 | 4/1988 | (GB) . |

OTHER PUBLICATIONS

The Wiley Encyclopedia of Packaging Technology, pp. 218–221, 1986.*
Schwimmer: Source Book of Food Enzymology, 207–208 AVI Publ. Comp., Westport, USA 1981.
Blanching of Vegetables for Freezing–Which Indicator Enzyme to Choose, Williams: Food Technology 40, 130–140 (1986).

* cited by examiner

*Primary Examiner*—Lien Tran
(74) *Attorney, Agent, or Firm*—Norris, Mclaughlin & Marcus

(57) ABSTRACT

A ready-to-bake, shelf-stable cake dough consisting essentially of flour, fat, sugar, eggs and water and usual dough additives and comprising a leavening system, the dough having a water activity of below 0.85 and being packed in an essentially gas-impermeable pouch in an atmosphere of an inert gas containing less than 4%, preferably less than 2% residual oxygen. A process for the manufacture of such a dough is disclosed.

10 Claims, No Drawings

READY-TO-BAKE, SHELF-STABLE CAKE DOUGH AND PROCESS FOR ITS MANUFACTURE

CROSS-REFERENCE TO RELATED APPLICATIONS

This is a divisional application of Ser. No. 09/044,449 filed Mar. 19, 1998, now U.S. Pat. No. 6,039,994.

BACKGROUND OF THE INVENTION

1. Field of the Invention

The present invention relates to a ready-to-bake, shelf-stable cake dough and the process for its manufacture.

2. Description of Related Art

Liquid doughs are known which require chemical conservation and low temperatures for suitable storage stability. German patent DE 36 32 567 discloses liquid doughs which can be stored for about six weeks under cooling after having been pasteurized at temperatures up to 75° C.

German patent DE 37 26 577 discloses a dough which can be kept for long periods without preservatives and without cooling due to its low water activity of between 0.60 and 0.80. This dough should contain 30–40% enzyme deactivated flour and a rather high proportion of 20–30% of dried starch and only 5–10% water. Therefore this dough is not pourable but must be rolled and cut into pieces and due to the required low water content it is impossible to incorporate whole eggs because this would cause a too high water content.

It has been one object of the present invention to provide a ready-to-bake, shelf-stable cake dough which is sufficiently liquid to be pourable and which can contain a high amount of liquid whole eggs as is required for certain cakes.

SUMMARY OF THE INVENTION

According to the present invention a ready-to-bake, shelf stable cake dough consisting essentially of flour, fat, sugar, eggs and water and usual dough additives is provided, which dough has a shelf-stability at ambient temperature of at least four months, preferably of four to six months and most preferably of 9 to 12 months. The dough of the present invention has a water activity of below 0.85, preferably of 0.81–0.83, and an overall water content of 18–25%, preferably of 20–23%. The dough according to the invention is packed in an essentially gas-impermeable pouch in an atmosphere of an inert gas containing less than 4%, preferably less than 2% residual oxygen.

DETAILED DESCRIPTION OF THE INVENTION

The cake dough according to the present invention consists essentially of (all percentages based on the final dough composition):

| | |
|---|---|
| 15–25% | fat |
| 15–30% | whole egg (liquid) |
| 3–6% | glycerol |
| 20–30% | sugar |
| 10–15% | flour |
| 10–15% | starch. |

Preferably the fat to be used in the invention is a hydrogenated, highly saturated vegetable fat containing no lauric acid and with a free acid content below 0.3%, preferably below 0.1% (calculated as oleic acid), an iodine value (Wijs) of 66–75 g/100 g, preferably 68–73 g/100 g, a peroxide value of max. 1.2, preferably max. 1.0 meg $O_2$/kg and a melting point of 20–35° C., preferably 32–35° C.

The egg component used according to the invention preferably is a pasteurized liquid whole egg composition which, for example, has been pasteurized at 65° C. for 3 minutes. A commercial composition of this kind usually has a dry matter content of 23%, i.e. a humidity of up to 77%.

The dough according to the invention contains 3–6% glycerol in order to control the required water activity of the dough.

The dough contains sugar not only for organoleptic reasons, but a high level of sugar is also used in order to lower the water activity.

Special care must be taken in the selection of the enzyme-inactivated flour. The alpha-amylase activity (determined by an accelerated Visco-test) should be essentially zero, the lipase activity (determined by the method of Purr: Nahrung 9, 445–454 (1965)) should be essentially zero and the peroxidase activity (determined by the modified Guaiacol assay according to Schwimmer: Food Enzymology, 207–208 AVI Publ. Comp. Westport USA (1981)) should be reduced by more than 90%. Preferably the flour has also no lipoxygenase activity (determined by Williams: Food Technology 40, 130–140 (1986)).

It was found that during the enzyme-inactivation of the flour by heat-treatment a pregelatinisation of the starch must be avoided because this may cause difficulties in the spreading characteristics of the dough. Therefore, as far as heat-treatment is applied, this has to be done without any pregelatinisation.

The starch, which is also incorporated into the dough of the present invention, preferably is a native wheat starch.

The dough of the present invention also contains a leavening system.

The leavening system may comprise an encapsulated chemical raising system which is stable during the storage of the dough. Preferably sodium bicarbonate, which is encapsulated with cotton seed oil, is used. This system is stable at ambient temperature and acts as a raising system only at higher temperatures which means only during baking, when the coating melts at temperatures above 60° C.

Preferably the leavening system also comprises an inert gas which is partially soluble in the dough, e.g. $N_2O$. During preparation of the dough this gas solubilizes into the dough and partly forms gas bubbles. The dough density is then between 0.5 and 0.7 g/ml, but during storage density increases up to about 1 g/ml. When the dough is baked, this gas contributes to the volume increase and the shape of the cake.

$N_2O$ is preferred as such inert gas because it does not change the acidity and the taste of the product.

The dough of the present invention must be packed in an essentially gas-impermeable pouch in an atmosphere of inert gas containing less than 4%, preferably less than 2% residual oxygen.

Suitable pouch materials are commercially available. Preferably the pouch material is a laminate of different materials with low gas permeation rates. A preferred laminate is a polyester-aluminum-polyethylene laminate.

It is essential that during the manufacturing process oxygen is completely removed from the dough and the dough is stored in an atmosphere which is as far as reasonably possible free from oxygen. This goal is it obtained by a repeated sequence of applying vacuum and breaking the vacuum by an inert gas, which is preferably nitrogen. A vacuum of −0.5 bar (−0.05 MPa) might be sufficient.

In a preferred process for the manufacture of the ready-to-bake, shelf-stable cake dough according to the present invention a)
  10–15% (based on the final dough composition) of an enzyme-inactivated flour,
  10–15% starch, preferably native wheat starch,
  20–30% sugar (sucrose),
  0.1–0.7% of an encapsulated chemical raising system, salt and optionally xanthan gum
are homogeneously mixed b) 15–25% fat pressurized with an inert gas, preferably nitrogen, are placed into a mixer, whereafter vacuum is applied and a liquid mix of 15–30% liquid, pasteurized whole eggs and 3–6% glycerol is sucked into the mixer in which the fat and the liquids are intensively mixed under vacuum to create an emulsion and remove the oxygen, whereafter the vacuum is broken with inert gas, preferably nitrogen;

c) the premix powder of step a) is added to the emulsion of step b) and mixed with the emulsion under vacuum for several minutes, preferably 10–12 minutes;

d) several, preferably 3, successive phases of injection of inert gas followed by vacuum during mixing are applied, to ensure a content of oxygen as low as possible;

e) the vacuum is broken with an inert gas which is at least partly soluble in the dough, preferably $N_2O$, and the dough is pressurized with said gas up to 1–2 bar (0.1–0.2 MPa) and mixed under this atmosphere for another 20–30 minutes;

f) whereafter the dough is packed in an essentially gas-impermeable pouch which is flushed with inert gas before it is sealed.

The packaged ready-to-bake dough according to the invention does not need any chemical preservative for shelf-stability, although it may contain some potassium sorbate. Moreover, the packaged dough according to the present invention does not need a pasteurization or another heat-treatment step to obtain an excellent shelf-stability of 4–6 months and even more at ambient temperature.

The invention will be further illustrated by the following Example.

EXAMPLE

A dough is prepared from the following components:

| | | |
|---|---|---|
| a1) | enzyme-inactivated flour | 11.40% |
| a2) | wheat starch | 12.57% |
| a3) | sugar | 26.20% |
| a4) | coated sodium bicarbonate | 0.12% |
| a5) | acid sodium pyrophosphate | 0.11% |
| a6) | salt | 0.20% |
| a7) | Keltrol F ® (xanthane) | 1.10% |
| b1) | Biscuitine N ® (hardened arachis oil) | 18.50% |
| b2) | whole eggs | 25.80% |
| b3) | glycerol | 5.00% |

The fat, component b1, pressurized with nitrogen up to a pressure of 1.5 bar, was placed into a mixer, whereafter vacuum, up to −0.5 bar was applied and with this vacuum a liquid mix of the whole eggs and the glycerol (components b2 and b3) was sucked into the mixer. In this mixer the fat and the liquids were then intensively mixed by means of paddles under a vacuum until a homogeneous emulsion was obtained. The vacuum was then broken with nitrogen and thorough mixture of components a1–a7 was added to the emulsion. Mixing was continued under vacuum of −0.5 bar for 10 minutes. While mixing was continued the vacuum was broken three times by the injection of nitrogen. Finally the vacuum was broken with $N_2O$ and the mix was pressurized with $N_2O$ up to 1.5 bar under continued mixing for another 25 minutes.

The so-prepared dough was filled into a polyester/aluminum/polyethylene laminate pouch in a manner which excluded the contact with air as far as possible by flushing the head space of the pouch with $N_2O$.

The so-prepared and packaged dough had an excellent shelf stability for more than 4 months at ambient temperature. The dough could be poured from the pouch directly into the baking mould and baked to yield an excellent cake.

What is claimed is:

1. A pourable, ready-to-bake, shelf-stable cake dough consisting essentially of flour, fat, sugar, eggs, glycerol, starch, water and a leavening system, wherein a vacuum was applied to said dough during its preparation, said dough having a shelf stability at ambient temperature of at least 4 months without said dough being pasteurized, the dough further having a water activity of below 0.85 and being packed in an essentially gas-impermeable pouch in an atmosphere of an inert gas containing less than 4% residual oxygen.

2. Cake dough according to claim 1 having an overall water content of 18–25%.

3. Cake dough according to claim 1 having a water activity of 0.81–0.83.

4. Cake dough according to claim 1 consisting essentially of

| | |
|---|---|
| 15–25% | fat |
| 15–30% | whole egg (liquid) |
| 3–6% | glycerol |
| 20–30% | sugar |
| 10–15% | flour |
| 10–15% | starch. |

5. Cake dough according to claim 1 containing 0.1–0.7% of an encapsulated chemical raising system.

6. Cake dough according to claim 1 which is leavened by an inert gas, which is partially dissolved in the dough.

7. Cake dough according to claim 6 wherein said inert gas is $N_2O$.

8. Cake dough according to claim 1 containing a fat having a melting point of 20–35° C.

9. Cake dough according to claim 1 containing a fat which is a hydrogenated, highly saturated vegetable fat containing no lauric acid.

10. Cake dough according to claim 1 which is packed in an essentially gas-impermeable pouch formed from a polyester/aluminum/polyethylene-laminate.

* * * * *